United States Patent [19]

Sakai

[11] Patent Number: 4,715,467
[45] Date of Patent: Dec. 29, 1987

[54] CONTROL SYSTEM FOR A FOUR-WHEEL DRIVE VEHICLE

[75] Inventor: Yasuhito Sakai, Higashimurayama, Japan

[73] Assignee: Fuji Jukogyo Kabushiki Kaisha, Tokyo, Japan

[21] Appl. No.: 713,935

[22] Filed: Mar. 20, 1985

[30] Foreign Application Priority Data

Mar. 27, 1984 [JP] Japan .................................. 59-59934
Mar. 27, 1984 [JP] Japan .................................. 59-59935

[51] Int. Cl.$^4$ ........................................... B60K 17/34
[52] U.S. Cl. .................................. 180/247; 74/665 T; 74/866; 180/233
[58] Field of Search ............... 180/247, 248, 249, 250, 180/240, 233, 197; 192/0.075, 0.076, 0.096; 74/665 T, 665 GA, 861, 866, 867

[56] References Cited

U.S. PATENT DOCUMENTS

| 4,369,671 | 1/1983 | Matsumoto et al. ........... 180/247 X |
| 4,466,502 | 8/1984 | Sakai .................................... 180/247 |
| 4,481,877 | 11/1984 | Takano et al. ..................... 180/233 |
| 4,514,811 | 4/1985 | Daubenmier et al. ....... 192/0.076 X |
| 4,538,700 | 9/1985 | Suzuki ................................. 180/248 |
| 4,576,061 | 3/1986 | Yamakawa et al. ............. 74/665 T |

FOREIGN PATENT DOCUMENTS

| 56928 | 4/1983 | Japan .................................... 180/247 |
| 73649 | 4/1984 | Japan ............................... 74/665 GA |
| 2118666 | 11/1983 | United Kingdom ................ 180/247 |

Primary Examiner—John J. Love
Assistant Examiner—Mitchell J. Hill
Attorney, Agent, or Firm—Martin A. Farber

[57] ABSTRACT

A control system for a four-wheel drive vehicle powered by an engine, having a hydraulically operated transfer clutch for transmitting the power of the engine to auxiliary driving wheels. A hydraulic circuit is provided for controlling the transfer clutch, and an electric circuit is provided for controlling the hydraulic circuit. The hydraulic circuit and electric circuit are so arranged that the clutch engaging torque decreases with a decrease of the load on the engine, thereby preventing tight corner braking during sharp cornering.

7 Claims, 8 Drawing Figures

CONTROL SYSTEM FOR A FOUR-WHEEL DRIVE VEHICLE

BACKGROUND OF THE INVENTION

The present invention relates to a control system for a four-wheel drive vehicle provided with an oil supply means and a hydraulic transfer clutch operated by the oil supplied by the oil supply means for establishing the four-wheel drive, and more particularly to a system for controlling the transfer clutch in accordance with driving conditions of the vehicle.

During the driving of a four-wheel drive vehicle, tire scraping occurs because of slight differences in effective wheel radii resulting from inevitable differences in tire inflation, tread wear or variation in loading. In addition, when the vehicle negotiates corners, braking phenomenon called "tight corner braking" may occur during sharp cornering. This is caused by the front wheels running through an arc of greater radius than that of the rear wheels and therefore tending to rotate faster than the rear wheels. This will result in an increase of tire wear and fuel consumption and decrease of driveability.

In order to eliminate such disadvantages, a four-wheel drive vehicle provided with an automatic transmission and a hydraulic transfer clutch is disclosed in U.S. Pat. No. 4,481,877.

In the four-wheel drive vehicle, the hydraulic transfer clutch is engaged by line pressure in the automatic transmission when engine load is heavy, since the line pressure increases at heavy load. When the vehicle turns a corner, the accelerator pedal of the vehicle is released, which means light load. Accordingly, the line pressure decreases to disengage the transfer clutch. Thus, the tight corner braking can be prevented.

However, a four-wheel drive vehicle without an automatic transmission must be provided with a hydraulic circuit to supply oil pressure to the transfer clutch in accordance with driving conditions of the vehicle. On the other hand, although a four-wheel drive vehicle having an infinitely variable belt-drive transmission has a hydraulic circuit, line pressure in the circuit increases in a low vehicle speed range such as sharp cornering. Accordingly, the line pressure can not be used for disengaging the transfer clutch during sharp cornering.

SUMMARY OF THE INVENTION

The object of the present invention is to provide a system for controlling a hydraulic transfer clutch for a four-wheel drive vehicle provided with a hydraulic circuit which may control the clutch torque of the transfer clutch to a proper value dependent on driving conditions of the vehicle so as to prevent the tight corner braking.

According to the present invention, there is provided a control system for a four-wheel drive vehicle, powered by an engine, having a transmission for transmitting the power of the engine to main driving wheels, auxiliary driving wheels, a hydraulically operated transfer clutch for transmitting the power of the engine to the auxiliary driving wheels, hydraulic circuit for operating the transfer clutch, and an electric circuit for controlling the hydraulic circuit.

The system comprises a hydraulic control circuit for supplying the oil in the hydraulic circuit to the transfer clutch and for controlling the transfer clutch, the hydraulic control circuit comprising a pressure regulator valve for regulating the line pressure of the hydraulic circuit, an accumulator for accumulating the oil supplied to the transfer clutch, a control valve for controlling the oil supplied to the transfer clutch, and a solenoid operated valve for controlling the oil passing the control valve, first means for detecting the load on the engine and for producing a load signal dependent on the load, the electric circuit comprising second means responsive to the load signal for producing a clutch engage control signal the magnitude of which is dependent on the load, the clutch engage control signal being applied to the solenoid operated valve, so that the clutch engaging torque decreases with a decrease of the load.

In an aspect of the present invention, the clutch engage control signal comprises pulses the duty ratio of which varies with engine load, the first means comprises an engine speed sensor and a vehicle speed sensor, and the second means comprises third means for producing engine torque, fourth means for producing transmission ratio of the transmission, and fifth means for producing a necessary clutch torque for the clutch engage control signal in dependence on signals from the fourth and fifth means.

The other objects and features of this invention will be apparently understood from the following description with reference to the accompanying drawings.

DETAILED DESCRIPTION OF THE PREFERRED EMBODIMENT

Figure 1:
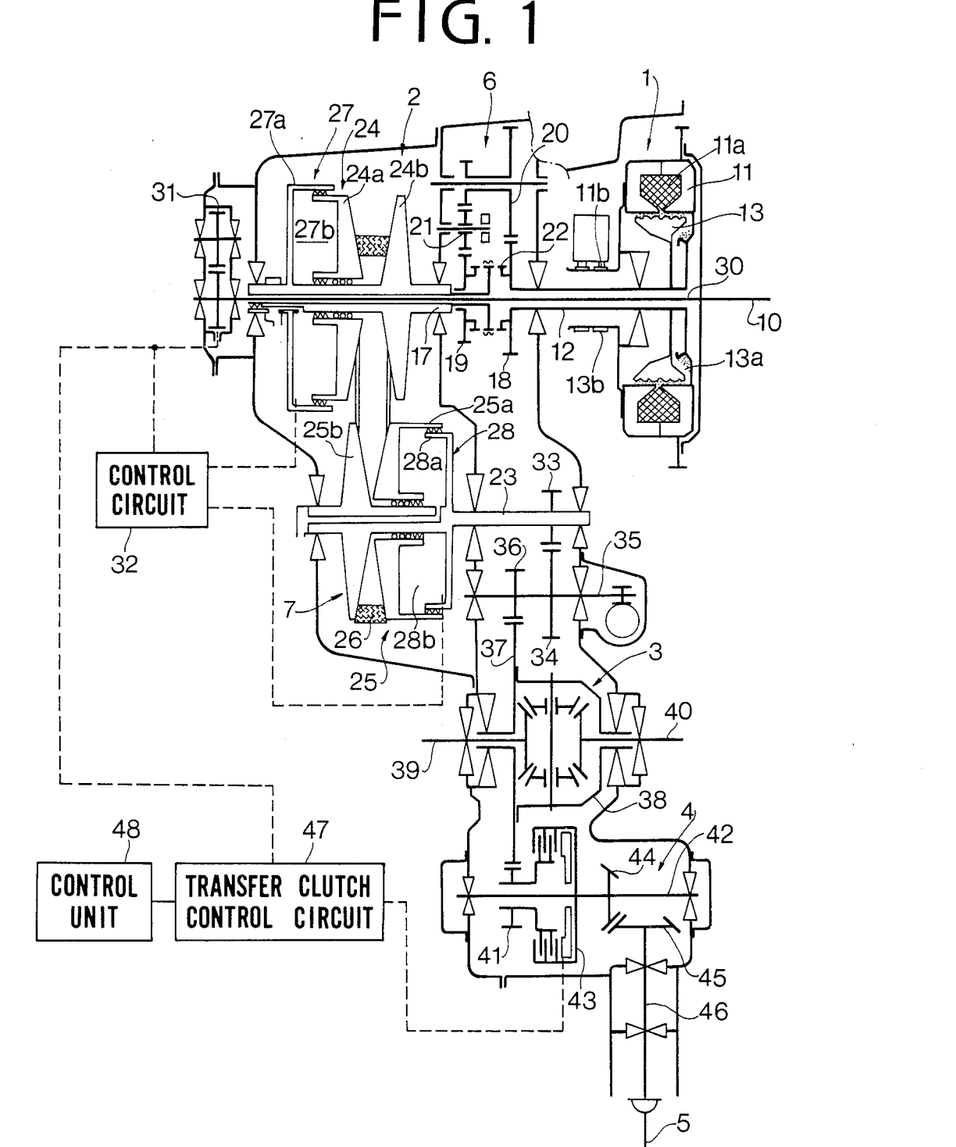
FIG. 1 is a schematic illustration of an infinitely variable belt-drive transmission to which the present invention is applied.

Referring to FIG. 1, an infinitely variable belt-drive automatic transmission for four-wheel drive vehicle to which the present invention is applied, comprises an electromagnetic powder clutch 1, an infinitely variable belt-drive transmission 2, and a final reduction device 3 for front drive wheels of the vehicle. The final reduction device 3 is operatively connected to rear drive wheels of the vehicle through a transfer device 4 and a propeller shaft 5. A crankshaft 10 of an engine (not shown) is connected to an annular drive member 11 of the electromagnetic powder clutch 1. The electromagnetic powder clutch comprises a magnetizing coil 11a provided in the drive member 11, a driven member 13 having its outer periphery spaced from the inner periphery of the drive member 11 by a gap, and a powder chamber 13a defined between the drive member 11 and driven member 13. The driven member 13 is secured to an input shaft 12 of the belt-drive transmission 2. The coil 11a is supplied through brushes 11b and slip rings 13b with control current form an electronic control circuit.

When the magnetizing coil 11a is excited by clutch current, drive member 11 is magnetized to produce a magnetic flux passing through the driven member 13. The magnetic powder in the powder chamber 13a is aggregated in the gap by the magnetic flux and the driven member 13 is engaged with the drive member 11 by the powder.

The infinitely variable belt-drive transmission 2 comprises a selector device 6 and a belt-drive device 7. The selector device 6 is provided between the input shaft 12 and a main shaft 17. The main shaft 17 is cylindrical and is disposed coaxially with the input shaft 12. The selector device 6 comprises a drive gear 18 integral with the input shaft 12, reverse driven gear 19 rotatably mounted on the main shaft 17, and a synchronizer 22 mounted on the main shaft 17. The drive gear 18 meshes with one of the gears of a counter gear assembly 20. Another gear of the counter gear assembly 20 engages with an idler gear 21, which in turn engages with the driven gear 19.

The synchronizer 22 has a well known mechanism and comprises a hub secured to the main shaft 17, and a synchronizer sleeve slidably engaged to the hub with splines. The synchronizer sleeve is adapted to engage with splines of the drive gear 18 or with splines of the driven gear 19.

At a neutral position (N range) of a selector lever (not shown), the synchronizer 22 does not engage either gear, so that the main shaft 17 is disconnected from the input shaft 12. When the synchronizer is engaged with the gear 18, the input shaft 12 is connected to the main shaft 17 through the synchronizer to provide a driving position (D range).

When the synchronizer is engaged with the reverse driven gear 19, the input shaft 12 is connected to the main shaft 17 through the gears 18, 20, 21 and 19 to provide a reverse driving position (R range).

The main shaft 17 has an axial passage in which there is disposed an oil pump driving shaft 30 connected to crankshaft 10 is mounted. An output shaft 23 is provided in parallel with the main shaft 17. A drive pulley 24 and a driven pulley 25 are mounted on the shafts 17 and 23 respectively. A fixed conical disc 24b of the drive pulley 24 is integral with main shaft 17 and an axially movable conical disc 24a is axially slidably mounted on the main shaft 17. The movable conical disc 24a also slides in a cylinder 27a formed on the main shaft 17 to provide a servo device 27. A chamber 27b of the servo device 27 communicates with an oil pump 31 through a passage and a pressure oil control circuit 32. The oil pump 11 is driven by the shaft 30.

A fixed conical disc 25b of the driven pulley 25 is formed on the output shaft 23 opposite the movable disc 24a and an axially movable conical disc 25a is slidably mounted on the shaft 23 opposite the disc 24b. The movable conical disc 25a has a cylindrical portion in which a piston portion 28a of the output shaft 23 is slidably engaged to form a servo device 28. A chamber 28b of the servo device 28 is communicated with the oil pump 31 through a passage and control circuit 32. A drive belt 26 engages with the drive pulley 24 and the driven pulley 25.

Secured to the output shaft 23 is a drive gear 33 which engages with an intermediate reducton gear 34 on an intermediate shaft 35. An intermediate gear 36 on the shaft 35 engages with a final gear 37. Rotation of the final gear 37 is transmitted to axles 39 and 40 of the rear driving wheels through a differential 38. The final gear 37 engages with a transfer gear 41 rotatably mounted on a transfer shaft 42. A hydraulic multiple disc transfer clutch 43 is provided to couple the gear 41 to the shaft 42. The shaft 42 is connected to the propeller shaft 5 through bevel gears 44, 45 and a drive shaft 46 for driving the auxiliary driving wheels.

The control circuit 32 is responsive to engine speed and throttle valve position for controlling the pressurized oil supply to servo devices 27 and 28 thereby moving the discs 24a and 25a. Thus, the transmission ratio is infinitely changed.

A transfer clutch control circuit 47 is provided to control the transfer clutch 43 using oil pressure from the control circuit 32 in accordance with a signal from a control unit 48.

Figure 2:
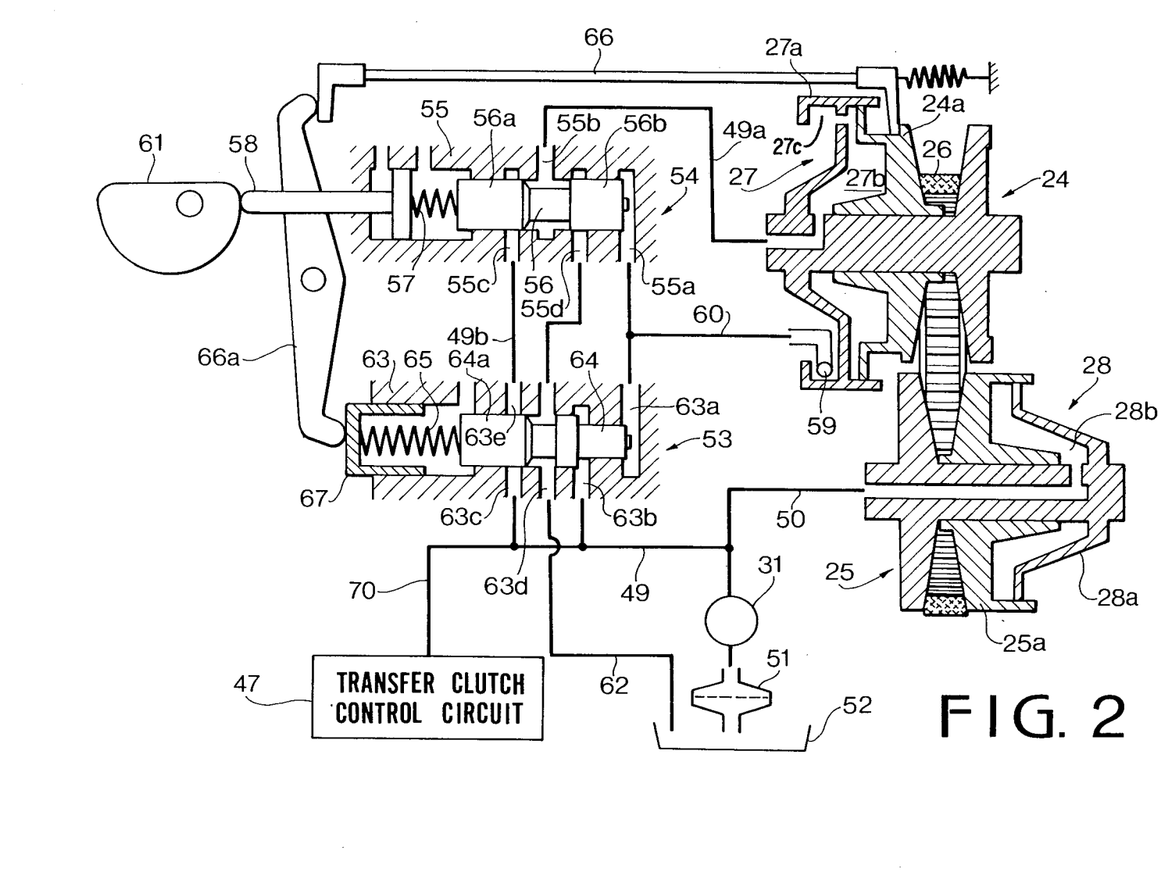
FIG. 2 is a schematic diagram showing a control system according to the present invention.

Referring to FIG. 2, chamber 27b of the servo device 27 is applied with pressurized oil by the oil pump 31 from an oil reservoir 52 passing through a filter 51, conduit 49, pressure regulator valve 53 and transmission ratio control valve 54. The chamber 28b of the servo device 28 is applied with pressurized oil through conduit 50 without passing through valves 53 and 54. The movable conical disc 24a is so designed that the pressure receiving area thereof is larger than that of the movable conical disc 25a.

The transmission ratio control valve 54 comprises a valve body 55, spool 56, spring 57 for urging the spool in the downshift direction, and an actuating member 58 which engages a shift cam 61. The shift cam 61 is operatively connected to an accelerator pedal of the vehicle so as to be rotated in dependency on the magnitude of depression of the pedal. A port 55b of the valve 54 is selectively communicated with a pressure oil supply port 55c or a drain port 55d in accordance with the position of lands 56a and 56b of the spool 56. Port 55b communicates with chamber 27b through a conduit 49a, and port 55c communicates with the pressure regulator valve 53 through a conduit 49b. The drain port 55d communicates with the oil reservoir 52 through a port 63d and conduit 62. The drive pulley cylinder 27a had an annular inside groove 27c in which a rotation speed sensor 59 in the form of a pitot tube is provided for measuring the speed of the oil in the groove, that is the speed of the main shaft 17 which varies dependent on the engine speed. The pitot pressure produced by the rotation speed sensor 59 as a pitot tube is applied to an end chamber 55a of the valve 54 through a passage 60.

Thus, the spool 56 is shifted in dependency on the pitot pressure dependent on the engine speed and on the pressure of the spring 57 dependent on the opening degree of the throttle valve which is operatively connected to the accelerator pedal. The amount of oil supplied to the chamber 27b increases with an increase of engine speed and with a decrease of the opening degree of the throttle valve to provide upshifting.

The pressure regulator valve 53 comprises a valve body 63, spool 64, and a spring 65 for urging the spool 64 in one direction. The spool 64 is applied with oil pressure supplied through conduit 49 and a port 63b, so that the spool 64 is moved to the left by the oil pressure at the port 63b. One end of the spring 65 engages with a slidable spring retainer 67 which is moved by an arm 66a and a sensor (rod) 66. The sensor rod 66 engages the disc 24a for detecting the transmission ratio during operation. A port 63c connected with conduit 49c is communicated with a conduit 49b through an annular groove 63e and selectively communicated with a port 63d in accordance with the position of a land 64a.

The chamber 63a is applied with the pitot pressure from the sensor 59 passing through passage 60. Accordingly, the spool 64 is applied with the pitot pressure, with the pressure applied to the port 63b, and with the pressure of the spring 65 dependent on the transmission ratio. When the engine speed increases, the rod 66 moves to the right to turn the arm 66a in the clockwise direction. Thus, the spool 64a is shifted to the left to communicate port 63c with drain port 63d. Accordingly, the line pressure decreases, thereby upshifting the transmission.

Thus, at a high transmission ratio where the transmission torque is large, line pressure is increased by the large force of the spring 65. As the transmission ratio decreases, the line pressure decreases to keep the engagement between the belt 26 and pulleys 24,25 so as not to cause the belt to slip.

A line pressure takeoff passage 70 is connected to a suitable line, for example to the conduit 49 to apply the line pressure to the transfer clutch control circuit 47.

Figure 3A:
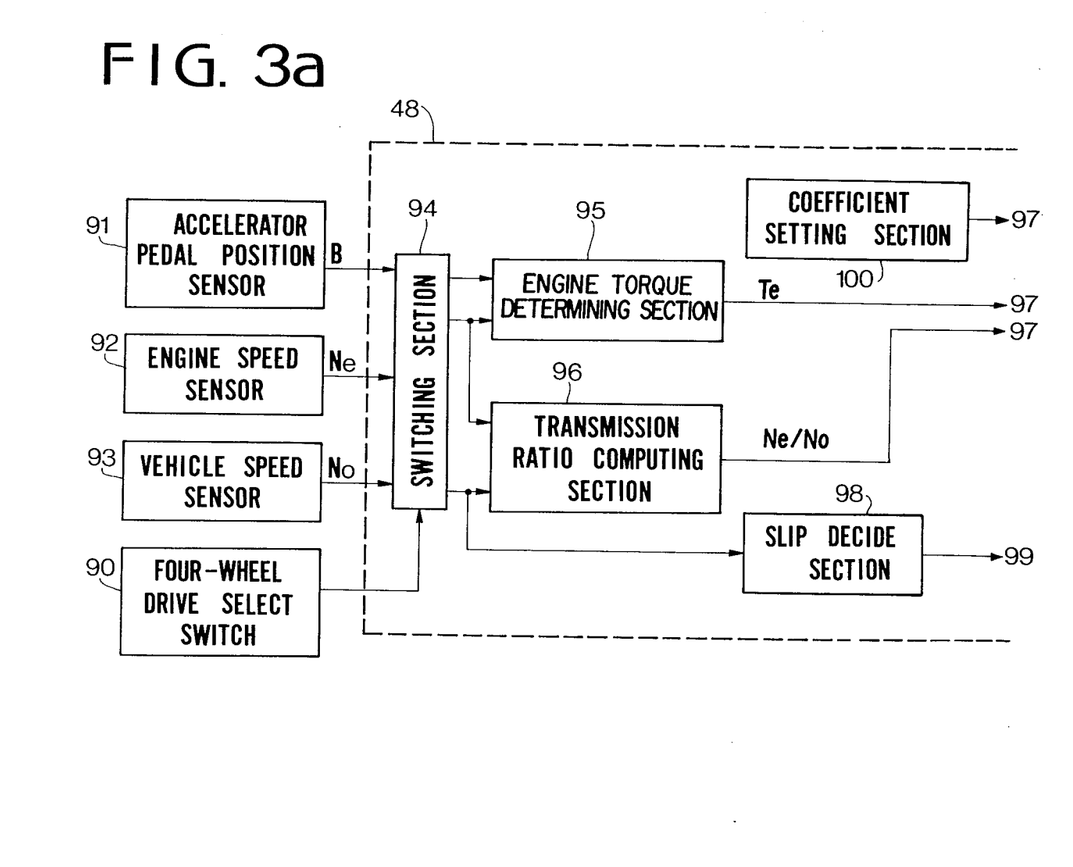
FIGS. 3a and 3b show an electronic control circuit and a part of a hydraulic circuit used in the control system.
Figure 3B:
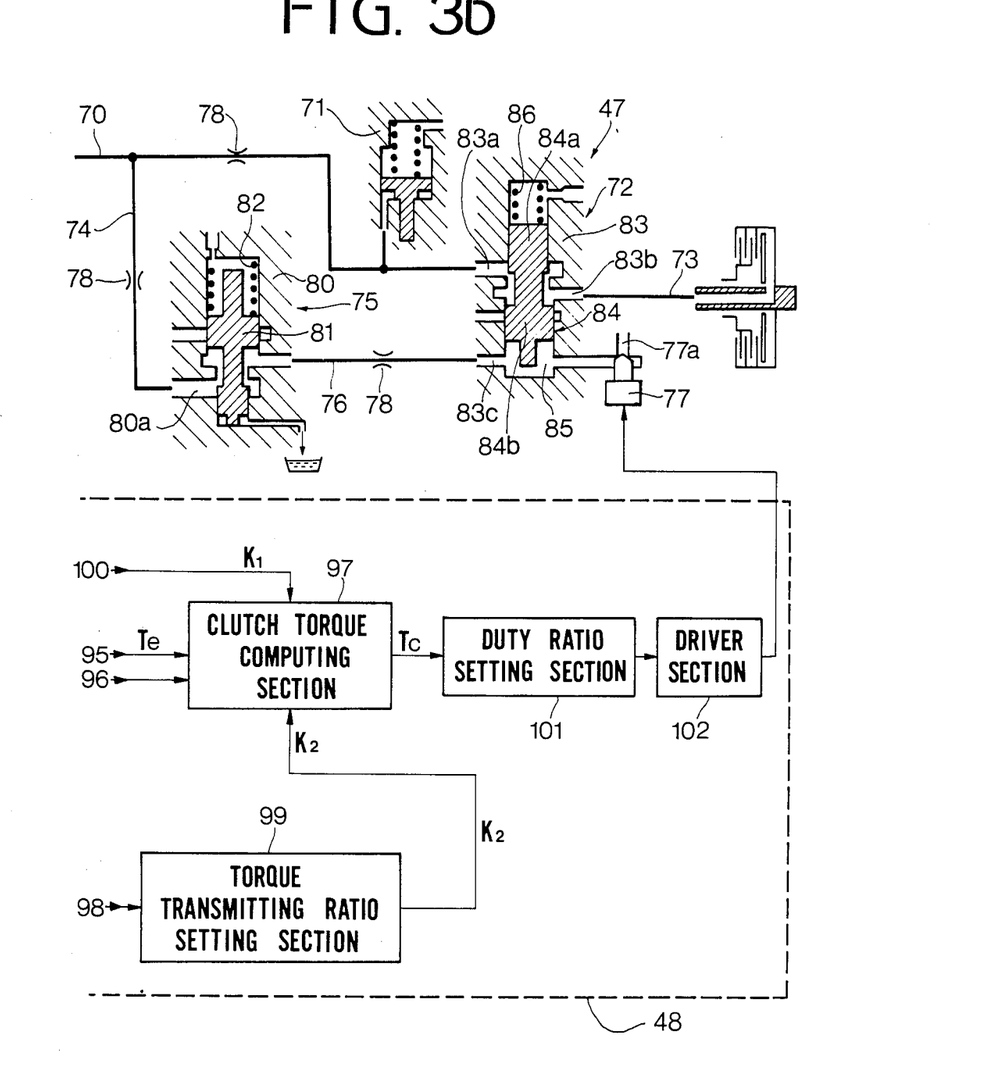

Referring to FIGS. 3a and 3b showing the transfer clutch control circuit 47 and control unit 48, the passage 70 is connected to an accumulator 71 and to a port 83a of a control valve 72 which is in turn connected to the transfer clutch 43 through a passage 73. A branch passage 74 of the passage 70 is connected to a pressure regulator valve 75 for producing a constant hydraulic pressure. The outlet port of the pressure regulator valve is communicated with an end chamber 85 of the control valve 72 through a passage 76. The chamber 85 is communicated with a drain port 77a through a solenoid operated valve 77, a valve body of which operates to control the opening degree of the drain port 77a. Orifices (restrictors) 78 are provide in passages 70, 74 and 76.

The accumulator 71 operates to conpensate the variation of the line pressure which occurs upon suddenly supplying oil to the clutch 43.

The control valve 72 comprises a valve body 83, spool 84, spring 86, ports 83a, 83b and 83c. The spool 84 comprises a first land 84a having a small diameter and a second land 84b a large diameter.

Explaining the electric control system by the control unit 48, there is provided a four-wheel drive select switch 90 for selecting the four-wheel drive, an accelerator pedal position sensor 91 as a sensor for sensing the load on the engine, an engine speed sensor 92, and a vehicle speed sensor 93 for producing a final gear speed (No). The accelerator pedal position sensor can be substituted with an intake manifold vacuum sensor. The control unit 48 comprises a switching section 94 receiving signals from the switch 90 and sensors 91-93, an engine torque determining section 95 for obtaining engine torque Te from a table with reference to engine speed Ne and accelerator pedal position B and a transmission ratio computing section 96 for producing reduction ratio Ne/No of the transmission. The signals Te and Ne/No are applied to a clutch torque computing section 97 for producing a clutch torque Tc. The control unit 48 further comprises a duty ratio setting section 101 for producing pulses having duty ratio which changes dependent on the clutch torque Tc, a driver section 102, a slip decide section 98 for detecting the slipping of driving wheels of the vehicle, a torque transmitting ratio setting section 99, and a coefficient setting section 100 for producing a coefficient K1.

Explaining the operation of the infinitely variable belt-drive transmission, while the vehicle is at a stop, the driven pulley servo chamber 28b is supplied with the line pressure adjusted by the pressure regulator valve 53 through the passage 50, and the drive pulley servo chamber 27b is drained, since the spool 56 is at the right end position by the spring 57. Thus, the driving belt 26 engages with the driven pulley 28 at maximum running diameter to provide the largest transmission ratio (low speed stage). When the acceleration pedal is depressed, the electromagnetic powder clutch 1 is excited by a clutch current, transmitting the engine power to the drive pulley 24. The power of the engine is transmitted to the output shaft 23 at the largest transmission ratio by the driving belt 26 and driven pulley 25, and further transmitted to axles of the driving wheels through the final reduction device 3. Thus, the vehicle is started.

Figure 5:
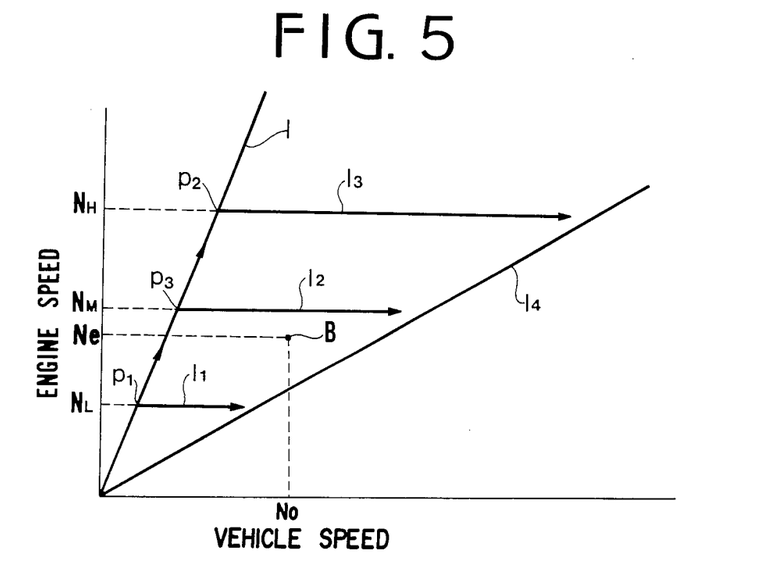
FIG. 5 is a graph showing the relationship between vehicle speed and engine speed.

At that time, the line pressure produced by the pressure regulator valve 53 is at the highest value. The pitot pressure produced by the speed sensor 59 increases with increase of the engine speed. The cam 61 pushes the rod 58 in dependency on the depression of the accelerator pedal, which causes the spool 56 to be moved to the right through spring 57. When the force dependent on the pitot pressure becomes higher than the force of the spring 57, the spool 56 is moved to the left to communicate the port 55c with port 55b, so that the line pressure is applied to the chamber 27b to move the disc 24a. Thus, the transmission ratio begins to change to a small value. Referring to FIG. 5, the transmission ratio begins to vary from a point between start points $P_1$ and $P_2$ on the largest transmission ratio line l in dependency on driving conditions of the vehicle. When the load on the engine is light, the transmission ratio begins to change at the start point $P_1$ at the smallest depression of the accelerator pedal at a low engine speed $N_L$. The point $P_2$ is a start point at the largest depression at heavy load at a high engine speed $N_H$ and point $P_3$ is a start point at a partial load at a middle engine speed $N_M$. For example, when the accelerator pedal is held at the largest depression, the transmission ratio decreases as shown by a transmission ratio varying line $l_3$ of FIG. 5, keeping the engine speed at the highest speed $N_H$. The line $l_3$ reaches the smallest transmission ratio line $l_4$. At light load and partial load, transmission ratio varies as shown by lines $l_1$, $l_2$.

When the four-wheel drive select switch 90 is opened, which means the selection of two-wheel drive, the clutch torque computing section 97 produces a signal Tc of zero. The duty ratio setting section 101 produces pulses having the duty ratio of about 100% dependent on the signal Tc, the pulses being applied to the solenoid operated valve 77 through driver section 102. By the pulses, the valve 77 acts to almost fully open the drain port 77a. Thus, the oil in the chamber 85 of the control valve 72 is discharged from the port 77a, so that the spool 84 is downwardly shifted by the spring 86 to close the port 83a to cut off the line pressure to the transfer clutch 43. Accordingly, the clutch is disengaged to establish the two-wheel drive.

When the select switch 90 is closed, the control unit 48 operates to obtain the engine output torque Te and clutch torque Tc. The engine output torque Te is expressed as Te=T(B, Ne)

Thus, the engine torque determining section 95 obtains the engine output torque Te from the table with reference to the acceleration pedal position B and engine speed Ne.

The necessary clutch torque Tc for transmitting the engine output torque Te is expressed as $$Tc = Te \cdot K_1 \cdot K_2 \cdot Ne/No$$
$$= T(Ne, No\ B)$$

where k$_1$ is a coefficient for correcting the torque transmitting rate, and K$_2$ is a coefficient for the torque transmitting ratio for the auxiliary drive wheels (usually 0.5-0.6).

Thus, the clutch torque computing section 97 computes the clutch torque Tc from signals Te, Ne/No, K$_1$ and k$_2$ or Ne, No and B. The duty ratio setting section 101 produces pulses as a clutch engaging signal, the duty ratio of which is decided by the clutch torque Tc. The duty ratio decreases with an increase of clutch torque which increases with increase of engine output torque (Te) and/or transmission ratio (Ne/No) of the automatic transmission. Namely, the duty ratio decreases with an increase of the engine output torque and the transmission ratio, thereby decreasing the amount of discharge of oil from the chamber 85 of the control valve 72.

When the amount of discharge oil decreases, the hydraulic pressure in the chamber 85 increases, so that the spool 84 is raised against the spring 86. Thus, oil passes through ports 83a and 83b and passage 73 to enter into the transfer clutch 43. The line pressure increases with a decrease of the duty ratio, so that clutch engaging pressure increases. Thus, four-wheel drive is established, and the clutch torque is controlled to a proper valve in accordance with the driving conditions of the vehicle. The clutch engaging pressure Pa is expressed as $$Pa = (S_1/Pb - F)/(S_1 - S_2)$$
$$= (S_1/(S_1 - S_2)\ Pb - F/(S_1 - S_2)$$

where
Pb is the control pressure in the chamber 85,
F is the force of the spring 86,
S$_1$ is the pressure receiving area of land 84b,
S$_2$ is the pressure receiving area of land 84a.
Since S$_1$, S$_2$ and F are constant, the clutch engine pressure Pa is decided by the control pressure Pb.

Figure 4:
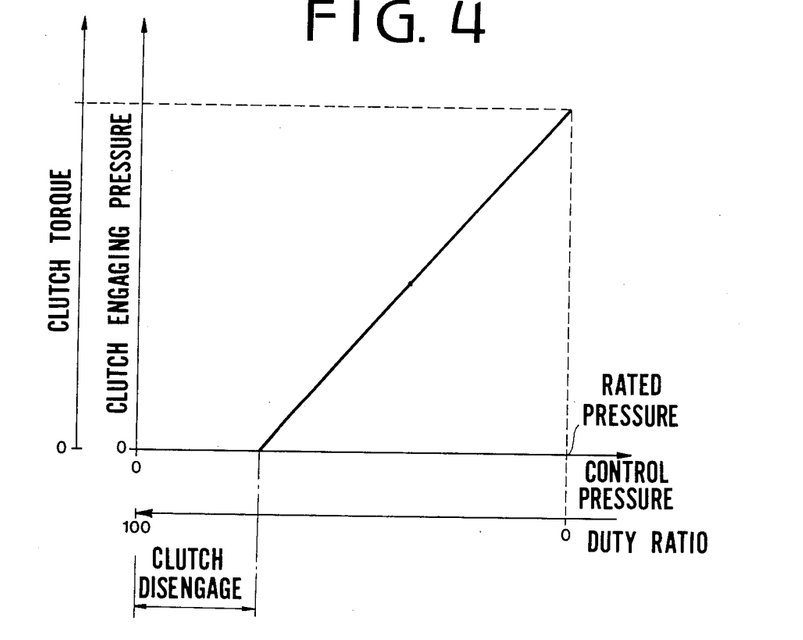
FIG. 4 is a graph showing the relationship between duty ratio and clutch torque.

When the vehicle negotiates a corner, the acceleration pedal is released to reduce the engine speed Ne and vehicle speed No. Thus, the duty ratio increases, increasing the discharge of the oil in the chamber 85. Accordingly, the clutch engaging pressure Pa decreases to prevent the tight corner braking. FIG. 4 shows the relationship between the duty ratio (control pressure) and the clutch torque (clutch engaging pressure).

When the main drive wheels slip on a slippery road, at two-wheel drive, dNo/dt becomes higher than a reference value. The slip decide section 98 produces a slip signal dependent on dNo/dt at the slipping of the wheels and torque transmitting ratio setting section 99 produces the signal K$_2$ dependent on the slip signal. Thus, the duty ratio is decided by the signal K$_2$ to engage the clutch 43 to establish the four-wheel drive to prevent the slipping of the wheels.

Figure 6A:
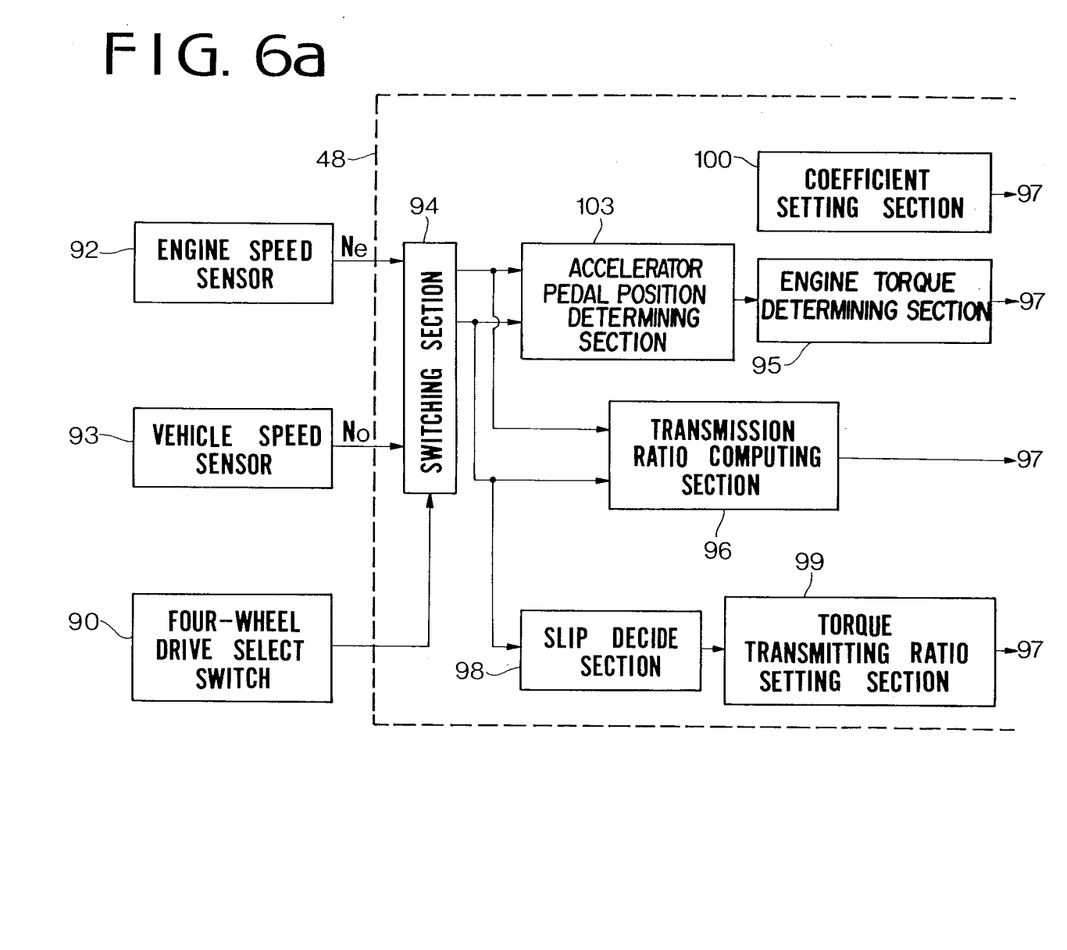
FIGS. 6a and 6b show another embodiment of the present invention.
Figure 6B:
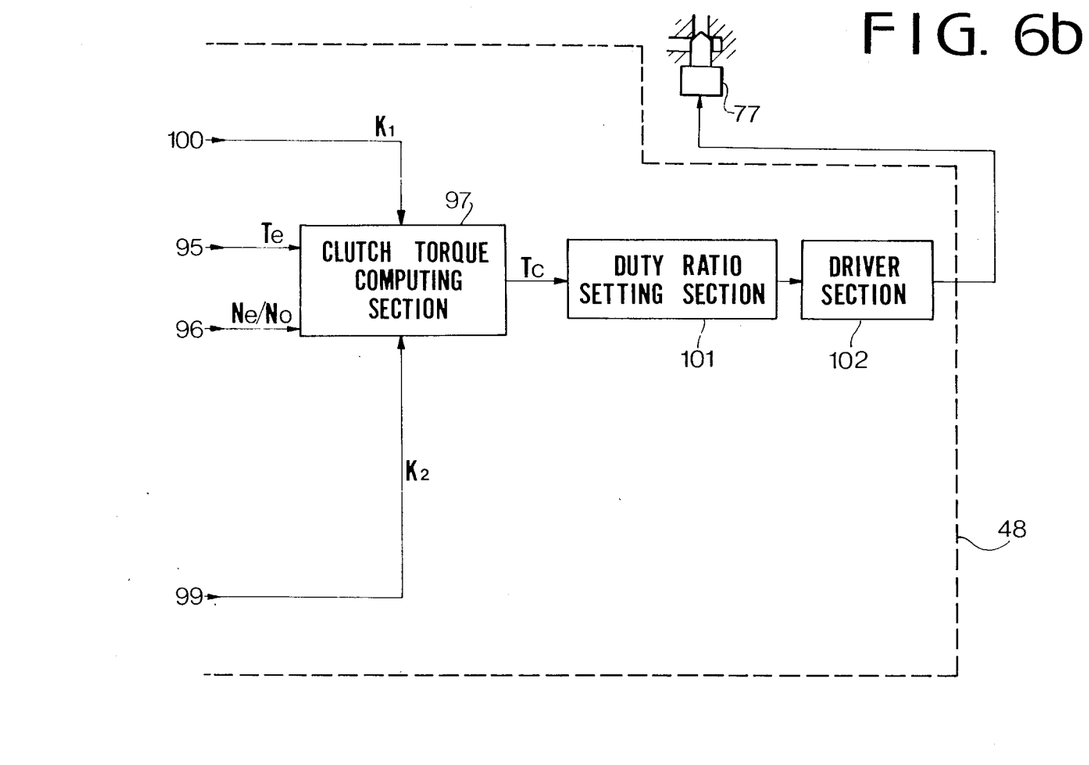

Although the above described system is provided with the accelerator pedal position sensor 91, the sensor can be omitted. FIGS. 6a and 6b show another embodiment of the present invention without the accelerator pedal position sensor, in which the same parts as FIGS. 3a and 3b are identified with the same reference numerals. Referring to FIG. 5, accelerator pedal position B can be presumed from engine speed Ne and vehicle speed No. Accordingly, an accelerator pedal position determining section 103 is provided for obtaining the accelerator pedal position B' from signals Ne and No. The engine torque determining section 95 produces the engine torque Te in the same manner as the previous embodiment. Other operations are the same as the first embodiment. Thus, the clutch torque is controlled in accordance with driving conditions of the vehicle.

While the presently preferred embodiment of the present invention has been shown and described, it is to be understood that this disclosure is for the purpose of illustration and that various changes and modifications may be made without departing from the spirit and scope of the invention as set forth in the appended claims.

What is claimed is:

1. In a control system for a switchable two-wheel drive four-wheel drive vehicle powered by an engine, the vehicle having a hydraulically operated automatic transmission for transmitting power of the engine to main driving wheels of the vehicle, auxiliary driving wheels, a hydraulically operated transfer clutch for transmitting the power of the engine to the auxiliary driving wheels for the four-wheel drive, a hydraulic circuit for controlling the transmission, said hydraulic circuit having a line pressure, and a hydraulic control circuit means for operating the transfer clutch, the improvement wherein:

said hydraulic control circuit means including a pressure regulator valve means for regulating the line pressure applied from the hydraulic circuit to the hydraulic control circuit means to a constant value, accumulator means for accumulating oil from the line pressure of the hydraulic circuit for being supplied to the transfer clutch, control valve means having a spool for controlling said oil supplied to the transfer clutch providing clutch engaging pressure, said pressure regulator valve means for applying said constant value line pressure to one end of the spool of said control valve means, and solenoid operated valve means for controlling the spool of the control valve means by controlling the pressure of said constant value line pressure against the spool to control the clutch engaging pressure of the oil applied to the transfer clutch;

first means for detecting engine operating conditions and for producing a torque signal dependent on the engine operating conditions;

an electric circuit means for controlling said solenoid operated valve means, said electric circuit means including second means responsive to the torque signal for producing a clutch engage control signal, the magnitude of said control signal being dependent on engine torque; and the clutch engage control signal being applied to the solenoid operated valve means to control the spool of the control valve means and beng such that the clutch engaging pressure decreases with a decrease of the engine torque.

2. The control system according to claim 1, wherein the clutch engage control signal comprises pulses having a duty ratio, the duty ratio of the pulses varies with engine load.

3. The control system according to claim 1 wherein the first means further comprises an accelerator pedal position sensor.

4. The control system according to claim 1 wherein said first means comprises an engine speed sensor, a vehicle speed sensor, third means responsive to the engine speed sensor and said vehicle speed sensor for producing a transmission ratio signal representing the transmission ratio of the transmission, and said electric circuit means is responsive to the torque signal and said transmission ratio signal for producing the clutch engage control signal.

5. The control system according to claim 1 wherein said transmission is an infinitely variable transmission.

6. The control system according to claim 1 wherein said accumulator means compensates variation of said line pressure of said hydraulic circuit when said oil is suddenly supplied to said transfer clutch.

7. The control system according to claim 1 wherein said transmission is an infinitely variable belt-drive transmission.

* * * * *